United States Patent [19]
Cox
[11] 3,843,848
[45] Oct. 22, 1974

[54] TELEPHONE LOOPTEST SYSTEM

[75] Inventor: Russell G. Cox, Bloomington, Minn.
[73] Assignee: Magnetic Controls Company, Minneapolis, Minn.

[22] Filed: Jan. 12, 1973
[21] Appl. No.: 323,140

[52] U.S. Cl. .......... 179/175.3 R
[51] Int. Cl. .......... H04b 3/46
[58] Field of Search .......... 179/175.3 R, 81 R, 2 A; 340/171

[56] References Cited
UNITED STATES PATENTS

| | | | |
|---|---|---|---|
| 2,935,572 | 5/1960 | Hastings et al. | 340/171 R |
| 3,049,592 | 8/1962 | Waldman | 179/2 A |
| 3,548,102 | 12/1970 | Schaum et al. | 179/2 A |
| 3,636,280 | 1/1972 | Wetzel | 179/175.3 |
| 3,739,107 | 6/1973 | Spencer | 179/175.3 |
| 3,773,986 | 11/1973 | Tremblay | 179/175.3 R |

*Primary Examiner*—Kathleen H. Claffy
*Assistant Examiner*—Douglas W. Olms
*Attorney, Agent, or Firm*—Neil B. Shulte

[57] ABSTRACT

Apparatus is provided for remote testing of the condition of a telephone communication line to the point of interfacial connection between the line and customer equipment. The apparatus includes sensing means responsive to a trigger signal inserted onto the line at the telephone company end, the trigger signal being an alternating current tone burst of a given frequency, given minimum time duration, and given minimum voltage level. The sensed trigger signal activates a switch means at the point of customer interface, with the switch means in its quiescent, first condition maintaining the integrity of the line and in its second, activated condition disconnecting the line and inserting onto the line for a given period of time a given electrical impedance and a disconnect indicator. The sensing means is responsive to the presence of the trigger signal independent of the condition of any equipment beyond the point of customer interface when the switch means is in its first condition. Means for testing the condition of the telephone line with the given electrical impedance on the line are provided at the telephone company end of the line.

14 Claims, 3 Drawing Figures

PATENTED OCT 22 1974 3,843,848

TELEPHONE LOOPTEST SYSTEM

BACKGROUND OF THE INVENTION

This invention relates to apparatus for the remote testing of the condition of a telephone communications line from the telephone company end to the point of interfacial connection between the telephone line and the customer equipment connected thereto. In the general case when difficulties are experienced in the use of customer equipment connected to a telephone line, the causes of those difficulties are not readily apparent. The telephone line oftentimes presents a possible source of the problem and must be tested by itself to ascertain the condition of the line to the point of customer interface. This testing has generally necessitated the presence of a telephone company representative at the point of customer interface in order to physically disconnect the customer equipment and insert a known test impedance as termination on the line for test purposes. The line can then be tested from the telephone company end by known methods.

Recent proposals have been made for enabling the remote testing of the condition of a line to the point of customer interface under some conditions of customer equipment failure. For example, one proposal would insert a direct current signal onto the line from the telephone company end, with a signal of proper voltage and time duration being detected to activate a switch at the point of customer interface and temporarily insert a known test impedance onto the line for purposes of testing. This DC System requires a trigger signal of at least a minimum DC voltage and time duration.

While proposals such as that of the DC System mentioned above provide a means for remote testing under some conditions of customer equipment failure, a need exists for a system which will operate under virtually any type of failure of the customer equipment. For example, if the customer equipment has failed and presents a shorted and grounded condition on its end of the line, the prior art DC System cannot be remotely activated. The need also exists for a system utilizing a trigger signal variable in accordance with customer requirements for minimizing interference with customer operations. For example, a system activated by a DC signal is likely to experience interference difficulties when operating on a DC communication system such as a teletype system.

BRIEF SUMMARY OF THE INVENTION

The invention presents a system for remotely testing the condition of a telephone communication line to the point of interfacial connection between the line and customer equipment. The system includes a switch means responsive to an alternating current trigger signal on the line with the switch movable in response to the trigger signal from a first condition in which the customer's equipment is normally connected to the communication line to a second condition in which a given electrical impedance is inserted onto the line for a given period of time. Also included is a sensing means responsive to the alternating current trigger signal for operating the switch means independent of any of a wide range of malfunction conditions of any equipment beyond the point of interface. An alternating current trigger signal generator for producing the trigger signal and test apparatus for determining the condition of the line while the given impedance is connected thereto are present at the telephone company end of the line. A disconnect indicator and the given electrical impedance are present at the point of interface for insertion onto the line for the period of time the switch is in its second test condition.

The invention provides apparatus for the remote testing of the condition of a telephone line to the point of interface regardless of the condition of any customer equipment beyond the point of interface. To this effect the invention can take the form of a current sensing device through the use of the combination of an inductor in series in the line, and a capacitor in parallel across the line and between the inductor and the customer equipment. In this configuration current produced by the trigger signal will be present in the inductor regardless of the condition of any such customer equipment, and that current can be sensed to initiate the remote testing in appropriate circumstances. The invention can also take the form of a voltage sensing device through the use of an inductor in series in the line and the sensing device in parallel across the line and between the inductor and the telephone company end of the line. In the latter configuration, voltage produced by the trigger signal will be present across the line regardless of the condition of any such customer equipment, and that voltage can be sensed to initiate the remote testing of the line.

The invention further provides apparatus for minimizing interference between the operation of testing the line and the normal customer use of the line. To this effect the system utilizes an alternating current trigger signal injected onto the line for initiating the movement of the switch into the test connection. Such an alternating current signal avoids interference with a direct current use of the line. Possible interference with an alternating current use of the line and possible activation by a spurious signal is avoided through the use of time, frequency, and signal level discrimination. Other objects and features of the invention will be apparent after a consideration of the accompanying specification, claims and drawing.

DETAILED DESCRIPTION OF THE INVENTION

Figures 1, 3:
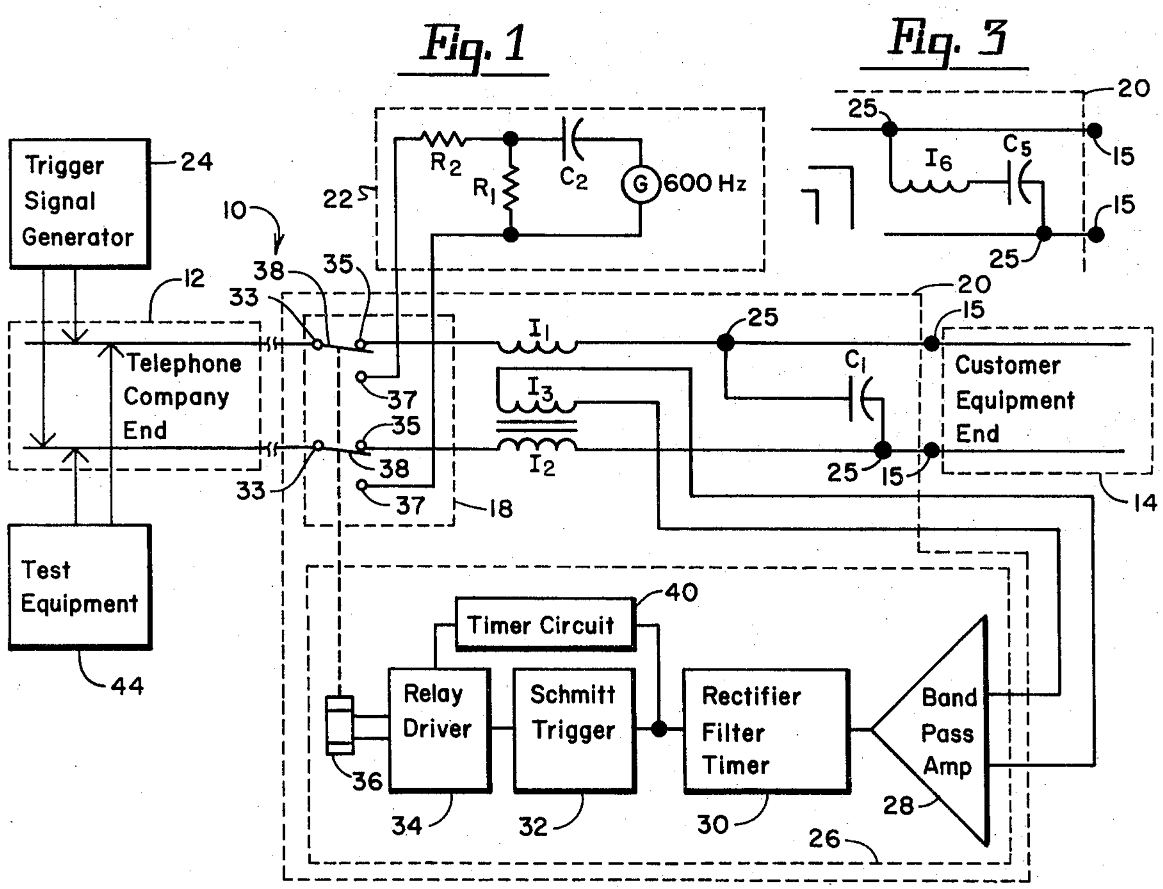
FIG. 1 is a block diagram of a telephone communication line containing a current sensing looptest system.
FIG. 3 is a partial block diagram illustrating a modification of the system of FIG. 1.

FIG. 1 illustrates the preferred embodiment of the invention. With reference to FIG. 1, a telephone communication line is illustrated at 10, with the line 10 running from the telephone company end at 12 to the customer equipment end at 14. The company end 12 symbolizes a location remote from the location of the customer end 14, from which company end 12 apparatus for testing the condition of the line can be connected onto the line. Preferably the company end 12 symbolizes a central location at which testing apparatus can be readily connected onto the line 10 by conventional methods.

The line 10 terminates at the customer equipment end 14, with terminals 15 symbolizing the point at which the customer equipment is connected as a termination of the line and termed interface terminals 15. Along the line and between the company end 12 and the customer end 14 are a switch means 18 and a sensing means 20. The switch means 18 is driven by the sensing means 20 to temporarily disconnect the line 10 from the customer end 14 and terminate the line with a test termination unit 22 adjacent the switch means 18.

The sensing means 20 is activated by the presence of an alternating current trigger signal on the line, which signal is inserted onto the line by a trigger signal generator 24 at the company end 12 of the line. The generator 24 is any known generator capable of generating a trigger signal in the form of an alternating current tone burst of given frequency, greater than minimum time duration and of a level dependent upon other factors as described below. The preferred embodiment uses a trigger signal of 2800±20. Hertz and of at least 10 seconds duration. Since the sensing means 20 of the preferred embodiment requires reception of a trigger signal greater than −25 dbm (25 decibels below 1 milliwatt) for energization, the level of the trigger signal at the point of the company end 12 is dependent upon the losses encountered during transmittal of the signal along the line 10. While in actual practice a particular trigger signal generator 24 with particular desired output characteristics may be used for a specific embodiment of this invention, any general sine wave source capable of providing a trigger signal of the desired parameters will provide a functioning unit for production of the trigger signal.

The sensing means 20 of FIG. 1 contains a bypass capacitor $C_1$ in parallel connection across the line and connected to terminals 25 on the line, and balancing inductors $I_1$ and $I_2$, with each inductor in a series connection in opposed sides of the line and with the inductors in the line between the telephone company end of the line 12 and the bypass capacitor $C_1$. A sensing inductor $I_3$ responds to the presence of a signal in the balancing inductors, with the inductors $I_1$, $I_2$, and $I_3$ taking the form of a three-winding transformer. Since the sensing inductor $I_3$ responds to the presence of the trigger signal in inductors $I_1$ and $I_2$ in the form of a current passing through the line 10 and through the inductors $I_1$ and $I_2$, this embodiment of the invention is termed a current sensing device. The bypass capacitor $C_1$ ensures that the current of a trigger signal will be present on the line 10 independently of the condition of any customer equipment 14 by providing a current path across the line between the inductors $I_1$ and $I_2$, and the customer equipment 14. For example, even if the customer equipment 14 presents an open circuit termination on the line 10, the bypass capacitor $C_1$ provides a current path and current will flow through the inductors $I_1$ and $I_2$ and be detected by the sensing inductor $I_3$. The balancing inductors $I_1$ and $I_2$ are of equal inductive value in order that the line 10 be maintained in balance with regard to line impedance. While the resulting balanced impedance of the line is preferable, presence of the balanced inductors is not necessary to carry out this invention in that only one of the inductors need be present to drive the sensing inductor $I_3$; for example $I_1$ could be omitted with $I_2$ and $I_3$ taking the form of windings of a transformer.

The output of the sensing inductor $I_3$ feeds into an analyzing system 26. This analyzing system 26 contains a band pass amplifier 28 for amplifying the output of sensing inductor $I_3$ if that output falls within the band pass width. The band pass amplifier 28 of the preferred embodiment is of standard design and rejects the frequencies of below 2,600 Hertz and above 3,000 Hertz. The amplified trigger signal from the amplifier 28 is fed into a time delay circuit 30, again of standard design. This time delay circuit measures the time presence of the trigger signal and delays activation of the remainder of the analyzing system 26 unless and until the trigger signal is present for at least the given minimum time duration. The time delay circuit 30 in the preferred embodiment provides a minimum time delay of 3 seconds. The output from the time delay circuit 30 activates a Schmitt Trigger 32 of standard design providing the input signal to the sensing means is −25dbm or greater. The relay driver 34 powers a relay coil 36. Switch means 18, here in the form of switch blades 38, is controlled by the relay coil 36. Switch blades 38 normally are biased into engagement with fixed contacts 35 in series with the customer equipment 14 and are movable upon energization of relay coil 36 out of engagement with contacts 35 and into engagement with fixed contacts 37 in series with test termination unit 22.

During regular operation of the customer equipment on the line, the switch blades 38 connected to terminals 33 on the line are in a first position in which they engage contacts 35 and terminate the line with the customer equipment end 14. Activation of the relay coil 36 causes the switch blades 38 to move out of engagement with contacts 35 and to move to a second position into engagement with contacts 37 wherein the line 10 is terminated with the test termination unit 22. Once activated, the relay coil remains activated until a given time has passed and is controlled in this respect by a timer circuit 40. The timer circuit 40 of the preferred embodiment is of standard design and, once activated, causes the coil 36 to remain in activation for a period of 30 seconds even if, as in FIG. 1, the operation of switch means 18 deenergizes inductor $I_2$ and hence inductor $I_3$. At the end of this time period the coil 36 is deactivated and the switch blades return to their original first position.

The test termination unit 22, normally located near the switch means 18, consists of a capacitor $C_2$ in series with a test tone generator 42; the series combination of which is in parallel with a resistor $R_1$; and the parallel combination of which is in series with a resistor $R_2$. The overall impedance of the test termination unit 22 serves as the known termination impedance for the testing of the line and can be varied in accordance with particular requirements. The test tone generator 42 serves as the preferred embodiment of a disconnect indicator by placing a given AC signal, of 600 Hertz in this embodiment, onto the line as a signal which can be detected at the company end 12, indicating that the line is terminated in the test termination 22. The test tone generator is of a standard design; the 600 Hertz tone is selected for the preferred embodiment since it is audibly recognizable over a speaker. Test equipment 44 is present at the telephone company end 12 for connection onto the line and use during the period that the test termination is connected onto the line. This test equipment 44 consists of standard equipment for testing a telephone line terminated with a known impedance.

Another embodiment of the invention is illustrated in FIG. 3 and includes substitution of a tuned L-C circuit for the bypass capacitor $C_1$, present in the embodiment of FIG. 1. The tuned L-C circuit has an inductor $I_6$ in series with a capacitor $C_5$, with that series L-C combination connected in parallel across the line 10 and connected to terminals 25 on the line. The L-C circuit of $C_5$ and $I_6$ is tuned to the particular trigger signal to be used, for example, with a trigger signal of 2,800 Hertz the L-C circuit can be readily designed by conventional means to present minimum impedance at that 2,800 Hertz frequency. Since the L-C circuit presents a higher impedance for line signals of both higher and lower frequencies than that of the trigger signal, the tuned L-C circuit tends to present more of a regular-line situation of a high impedance across the line, except when a signal of the frequency of the trigger signal is present on the line. The tuned L-C circuit serves the same function of the bypass capacitor $C_1$, of FIG. 1 in that the L-C circuit ensures that the current of a trigger signal of the proper frequency will be present on the line 10 independently of the condition of any customer equipment 14 by providing a current path across the line and between the inductors $I_1$ and $I_2$ and the customer equipment 14.

Figure 2:
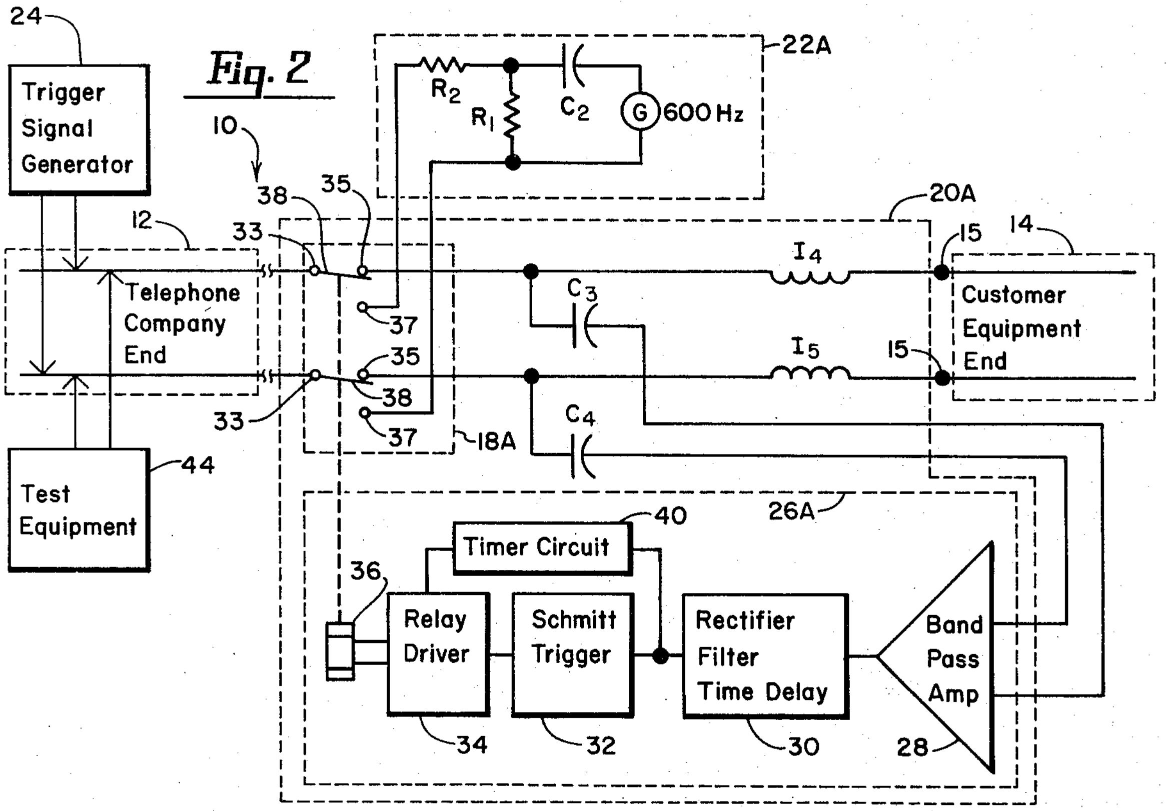
FIG. 2 is a block diagram of a telephone communication line containing a voltage sensing looptest system.

Another embodiment of the invention is illustrated in FIG. 2. This embodiment represents a modification of the system in FIG. 1 in that this system relies upon voltage sensing rather than upon current sensing. In describing the circuit of FIG. 2, the same reference characters as those in FIG. 1 are used where the elements identified are identical in both FIG. 1 and FIG. 2. Where the elements identified in FIG. 2 are similar to those in FIG. 1, the same reference character with the suffix "A" is used.

With reference to the FIG. 2, a telephone communication line 10 includes a telephone company end 12 and a customer equipment end 14. A switch means 18A is present on the line and is driven by sensing means 20A to temporarily disconnect the line and insert a test termination unit 22A onto the line. The sensing means 20A contains an analyzing system 26A for driving the switch means 18A in response to the proper alternating current trigger signal being present as a voltage across the line 10. The switch means 18A, test termination 22A, and analyzing system 26A are the same as those of the embodiment of FIG. 1 and need no further description.

The sensing means 20A also contains balancing inductors $I_4$ and $I_5$ in the same manner as in FIG. 1. The system of FIG. 2 differs in the apparatus for feeding the trigger signal from the line to the analyzing system 26A in that here the analyzing system 26A is placed in parallel across the line and between the company end of the line and the balancing inductors $I_4$ and $I_5$. A coupling capacitor, $C_3$ and $C_4$, is inserted into each lead of the analyzing system between the line and the amplifier 28 for the purpose of blocking DC signals from the line 10 to the analyzing system 26A. Since the analyzing system 26A responds to the presence of the trigger signal in the form of a voltage across the line 10, the embodiment of the invention in FIG. 2 is termed a voltage sensing device. The inductors $I_4$ and $I_5$ in the line ensure that this voltage of a trigger signal will be present across the line at a point between the telephone company end of the line 12 and the inductors $I_4$ and $I_5$ independently of the condition of any customer equipment 14.

While the particular values of the resistors, capacitors and inductors in the circuits are not of absolute importance in the operability of the circuits, one embodiment of the circuit in FIG. 1 uses these values in conjunction with a trigger signal of about 2,800 Hertz: $R_1$ of 33 kilohms; $R_2$ of 47 ohms; $C_1$ of 0.0033 micro-farads; and $C_2$ of 1 micro-farads.

OPERATION

With reference to the embodiment of FIG. 1, prior to testing the line 10 provides an electrical path between the telephone company end 12 and the customer equipment end 14. The switch blades 38 are in their first condition, maintaining electrical contact with the remainder of the line to the customer end 14.

In order to initiate testing, the alternating current trigger signal of appropriate frequency, greater than the minimum time period and of sufficient minimum voltage is inserted onto the line by the trigger signal generator 24. This trigger signal produces a comparable signal in the sensing inductor $I_3$, which signal is amplified through the band pass amplifier 28 and overrides the time delay 30 to trigger the Schmitt Trigger 32. The Schmitt Trigger output activates the relay driver 34 which drives the relay coil 36 to force the switch arms 38 to disconnect from the remainder of the line 10 and move to their second condition connecting with the test termination 22B. This connection is maintained until the timer circuit 40 causes the relay driver 34 to release the switch arms 38 to their original, first condition.

During the time that the switch blades 38 are connected to the test terminal the line can be tested by the test equipment 44 at the company end 12 of the line. If the tests indicate that the line is in proper condition with the test termination 22 in place, then the trouble must exist at some point beyond the interface 15. Also during this time the test tone placed on the line by the test tone generator 42 can be detected at the company end as an indication that the test termination 22 has been connected and as an indication that testing may proceed. The 600 Hertz signal generated in the preferred embodiment can be detected as an audible tone over a speaker connected to the company end of the line. The embodiment of FIGS. 2 and 3 operate in the same manner as that of FIG. 1.

It is apparent from the circuits of the current sensing devices of FIGS. 1 and 3 and the voltage sensing device of FIG. 2 that all devices can be activated regardless of the condition of the line beyond the interface terminals 15. If, for example, the customer end 14 of the line is shorted, grounded, or open, the devices can still be activated by the trigger signal on the line. In the device of FIGS. 1 and 3, current will flow through the inductor $I_2$ regardless of the condition of the customer end 14. In the device of FIG. 2, voltage will be present across the band pass amplifier 28B regardless of the condition of the customer end 14.

It is also apparent that the devices of FIGS. 1, 2 and 3 can be adapted to minimize interference between the operation of initiating the testing of the condition of the line 10, and the normal customer use of the line. Possible interference is primarily minimized through the appropriate variance of the frequency, duration, and magnitude parameters of the trigger signal and its detection. Proper selection of these signal parameters also affords protection against accidental activation of the switching means 18 by a spurious signal on the line.

The foregoing specification describes the background and nature of the invention, including specific embodiments presently contemplated as the best modes of carrying out the invention. Further modifications and adaptations will occur to those skilled in the art without department from the spirit and scope of this invention.

What is claimed is:

1. In apparatus for remote testing of the condition of a telephone communication line which comprises a pair of conductors to the interface connection point to customer equipment in which apparatus there is an electrical impedance of given value at the interface connection point, switch means responsive to a trigger signal on the telephone communication line changeable in response to the trigger signal from a first condition in which the customer's equipment is normally connected to the communication line to a second condition in which the given electrical impedance is connected thereto for a given length of time, and means for testing the condition of the telephone line with a given electrical impedance connected thereto, the improvement comprising:

means for applying an alternating current trigger signal to the line for at least a predetermined period of time;

and inductive sensing means connected in series between a first and second section of one of the conductors responsive to the presence of the alternating current trigger signal for said predetermined period of time for operating the switch means independently of the condition of any equipment beyond the point of interface connection when the switch means is in its first condition.

2. The apparatus of claim 1 wherein the sensing means includes means responsive to the current flow in the line resulting from the application of said alternating current trigger signal to the line for changing the switch means from its first condition to its second condition.

3. The apparatus of claim 2 including:

a capacitor between the conductors at a point between the inductive sensing means and the customer equipment; and an analyzing system responsive to the presence of current flow in said sensing means resulting from the application to the line of said alternating current trigger signal for changing the switch means from its first condition to its second condition.

4. The apparatus of claim 2 wherein the sensing means comprises:

a first inductor means in series in at least one of the conductors; and further including a capacitor in series with a second inductor means, the combination of the capacitor and the second inductor means connected between the conductors at a location between the first inductor means and the customer equipment; and an analyzing system responsive to the presence of current flow in said first inductor means resulting from the application to the line of said alternating current trigger signal for changing the switch means from its first condition to its second condition.

5. The apparatus of claim 1 including analyzing means responsive to the voltage across the line resulting from the application of said alternating current trigger signal to the line for changing the switch means from its first condition to its second condition.

6. The apparatus of claim 5 wherein the sensing means further includes an inductor means in series in at least one of the lines between the analyzing system and the customer's equipment.

7. The apparatus of claim 1 wherein the sensing means includes:

a band pass amplifier responsive only to a trigger signal within a given frequency range; and a time delay circuit responsive only to a trigger signal of a greater than given time duration.

8. The apparatus of claim 1 further including a disconnect indicator for placing a given signal on the line while the switch means is in its second condition.

9. Apparatus for remote testing of the condition of a pair of telephone communication lines to the interface connection point to customer equipment comprising:

switch means responsive to a trigger signal on the telephone communication lines movable in response to the trigger signal from a first condition in which the customer's equipment is normally connected to the communication lines to a second condition;

an electrical impedance of given value at the interface connection point;

means operative when said switch means is in said second condition to connect said impedance across said telephone lines;

means for testing the condition of the telephone lines with the electrical impedance connected thereto;

means for applying an alternating current trigger signal to the lines for at least a predetermined time, and sensing means responsive to the presence of the alternating current trigger signal for operating the switch means, the sensing means including an inductor means in series in at least one of the lines, a capacitor across the lines at a point between the inductor means and the customer equipment, and an analyzing system including a band pass amplifier and a time delay circuit responsive to the presence of the alternating current trigger signal in the inductor means.

10. Apparatus for the remote testing of a telephone communication line comprising a pair of conductors up to the customer equipment connection comprising:

means to apply an alternating current trigger signal to said line;

an inductive pickup means in series in the circuit defined sequentially by one of said pair of conductors, the customer equipment, and the other of said pair of conductors at a point just before the customer equipment so as to detect the alternating current trigger signal; and switch means connected to said inductive pickup means responsive to the detection of said trigger signal to connect a known impedance across the pair of conductors.

11. The apparatus of claim 10 in which said inductive pickup means comprises a pair of balanced inductors, one in each of the conductors, and a third inductor magnetically coupled to said balanced inductors and electrically connected to said switch means.

12. The apparatus of claim 11 including a capacitor connected across the pair of conductors containing the balanced inductors at a point between the inductors and the customer equipment.

13. The apparatus of claim 10 in which said inductive pickup means comprises:

a first inductor means in series in at least one of said conductors;

a capacitor in series with a second inductor means, the combination thereof connected between said pair of conductors at a point between the first inductor means and the customer equipment.

14. The apparatus of claim 10 wherein the inductive pickup means comprises an inductor in series in at least one of said conductors and voltage sensing means responsive to the voltage across the pair of lines resulting from said trigger signal, said voltage sensing means connected to said switch means so as to connect the known impedance to said pair of lines.

* * * * *